United States Patent [19]

Finelli et al.

[11] 3,914,395

[45] Oct. 21, 1975

[54] PROCESS FOR THE MANUFACTURE OF HIGH STRENGTH CARBON/CARBON GRAPHITIC COMPOSITES

[75] Inventors: Thomas M. Finelli, North Andover; Edward Lenoe, Andover; Lawrence E. McAllister, Chelmsford, all of Mass.

[73] Assignee: Avco Corporation, Cincinnati, Ohio

[22] Filed: Jan. 14, 1974

[21] Appl. No.: 433,057

Related U.S. Application Data

[63] Continuation-in-part of Ser. No. 240,792, April 3, 1972, abandoned.

[52] U.S. Cl. ............. 423/448; 117/46 CB; 264/29; 423/447
[51] Int. Cl.² ................... C01B 31/04; C01B 31/07
[58] Field of Search .......... 423/448, 445, 447, 449; 264/29; 117/46 CB, 46 CC

[56] References Cited
UNITED STATES PATENTS

| | | | |
|---|---|---|---|
| 3,174,895 | 3/1965 | Gibson et al. | 264/29 X |
| 3,321,327 | 5/1967 | Blanchard et al. | 264/29 X |
| 3,367,812 | 2/1968 | Watts | 423/447 X |
| 3,407,038 | 10/1968 | Beasley | 423/447 |
| 3,462,289 | 8/1969 | Rohl et al. | 117/46 |
| 3,573,086 | 3/1971 | Lambdin | 117/46 |
| 3,579,401 | 5/1971 | Cauville et al. | 423/447 X |
| 3,657,061 | 4/1972 | Carlson et al. | 117/46 CC X |
| 3,682,595 | 8/1972 | Okuda et al. | 423/447 |
| 3,720,575 | 3/1973 | Cowlard | 423/447 X |
| 3,728,423 | 4/1973 | Shaffer | 264/29 |
| 3,772,115 | 11/1973 | Carlson et al. | 264/29 X |

*Primary Examiner*—Edward J. Meros
*Attorney, Agent, or Firm*—Charles M. Hogan, Esq.; Abraham Ogman, Esq.

[57] ABSTRACT

High strength graphitized carbon/carbon composites are made by subjecting a preform of resin impregnated carbon fiber to multiple reinforced composite carbonization and graphitization heat treatments. Carbon fibers are produced by subjecting carbonizable fibers such as cellulosic fibers to carbonization temperatures below about 1000°C. Normally carbon fibers are a step product in the formation of graphite fibers. During the heat treatments, the binder resin is repeatedly carbonized and graphitized, and the carbon fibers are graphitized to a high strength material.

4 Claims, No Drawings

PROCESS FOR THE MANUFACTURE OF HIGH STRENGTH CARBON/CARBON GRAPHITIC COMPOSITES

This application is a continuation-in-part of Ser. No. 240,792, filed Apr. 3, 1972, now abandoned.

This invention relates to the process for the manufacture of high strength carbon/carbon composites of a graphitic character.

It is well known that to form high modulus, high strength shaped bodies of graphitized carbon a carbon/carbon composite system should be employed. Typically, the composite is made by impregnating high strength, high modulus graphite fibers with a high carbon producing binder material, such as, for example, pitch or a phenolic resin, shaping the mixture of carbonizable binder and graphite fibers into a preform, followed by carbonization and then graphitization. Since the carbonization and graphitization steps thermally decompose the binder, releasing volatile decomposition products from the resulting binder matrix, common practice is to reimpregnate with more binder and regraphitize. The number of treatment cycles varies with the reinforcement geometry within the composite. For composites containing unidirectional reinforcing fibers, three impregnation and graphitization steps usually are employed as achieving the best density and mechanical properties. Shaped graphitic carbon/carbon composites employing high quality graphite fibers have achieved densities about 1.75 grams/cc, flexural strength of about 60,000 psi, and flexural modulus in the range of $35-42 \times 10^6$ psi.

Herefore it has been widely believed that high strength, high quality carbon/carbon composites could be formed only if the fibers reinforcement therein were high strength, high modulus graphite fibers. Without fibrous reinforcement or with low quality carbonaceous fibers for reinforcement, the structural strength of the product carbon body has been relatively low. The graphite fibers reinforcement in the graphitic carbon/carbon composite contribute materially to the physical properties thereof.

Typically, the graphite fiber is made by carbonizing a fibrous carbonizable material, such as, for example, rayon filaments. Virtually all cellulosic fibers: cotton, linen, wood, etc., have been suggested for the starting material. For that matter, fibers or filaments made from almost every fiber forming synthetic resin has been suggested. So, too, have fibers made from petroleum pitch. Considerable art exists on formation of graphite fibers. A typical procedure for forming the graphite fiber involves heating the fiber under non-oxidizing conditions to a temperature level which carbonizes but does not graphitize the source material and form thereby a carbon fiber. Temperatures up to about 1,000°C are employed for this carbonization. Thereafter the carbon fiber is graphitized by heating under non-oxidizing conditions to temperature levels in excess of 2,000°C under mild tension. Inasmuch as the carbon fiber is relatively fragile and quite frangible and tensioning is required during graphitization for best product properties, a fantastic cost differential exists between carbon fibers and graphite fibers. To repeat, high quality graphite fibers have been employed in the formation of high strength, high modulus carbon/carbon composites without seriously questioning the need to do so.

It has now been discovered that high strength carbon/carbon composites can be formed using carbon fiber as the reinforcement therein, provided the resin impregnated carbon fiber reinforced composite preform is subjected to multiple graphitizing conditions during the treatment cycle. Overall the flexural strength and flexural modulus of graphitic carbon/carbon composites formed using carbon fibers are of the same order of magnitude as comparable composites using graphite fibers, being for example up to about one half of the flexural strength and modulus values obtainable with the highest quality graphite fibers.

The rationale of the present invention is an appreciation that subjecting a preform of carbon fibers and carbonaceous binder to multiple graphitizing conditions will cause substantial graphitization of the carbon fibers, and result in a high strength, high modulus product. The initial carbonization stage of the treatment cycle apparently converts the binder to a continuous (amorphous carbon) matrix which locks the carbon fibers in place within the matrix. It is believed that the further shrinkage of matrix and of the carbon fibers which occurs during the graphitization treatment applies tensile stresses to the carbon fibers. While the carbon fiber is largely unaffected at the temperature levels of the carbonization stage it is, of course, affected by graphitization temperatures, as is the carbon matrix. However the locked in place carbon fiber is not free to shrink more longitudinally than the surrounding matrix allows it to shrink in that direction. In a real sense, stress graphitization occurs to create, in situ, middling to high quality graphite fibers within the graphitized composite which in turn acts to strengthen the graphitized carbon/carbon composite. Conceivably some stress graphitization of the matrix occurs also.

Though both the fibers and matrix are graphitized, their structures are different. The stressed fibers form an anisotropic crystal structure. The matrix remains isotropic.

The carbon fibers employed in the practice of the present invention are readily available. Useful are the carbon fibers available as an intermediate step product during the procedures used to convert carbonizable fibers to graphite fibers, e.g., the rayon fiber-to-graphite fiber procedures. Briefly, carbon fiber may be defined or identified as the fiber product resulting from pyrolyzing a carbonizable fiber at temperatures up to about 1,000°C and include for example the carbonized product of cellulosic fibers, organic resin fibers, spun petroleum pitch.

The carbon content of the carbon fiber is in excess of about 90%, and generally speaking, the carbon therein is in an amorphous state (in contrast to the crystalline state of graphite fibers). By and large the prior art teachings with regard to carbon fibers have been posed within a context of converting such carbon fiber to graphite fibers by thermal treatment at very elevated temperatures, as witness for example, the teachings in U.S. Pat. Nos. 3,305,315, 3,313,597 and 3,552,922. So far as is known, the prior art efforts to make structurally sound high strength, high modulus graphitic carbon/carbon composites contemplated only use of graphitic materials for reinforcement purposes. In one procedure suggested to the art (by U.S. Pat. No. 3,174,895 for example) a graphitized cellulosic cloth has a carbonizable binder added thereto. According to another procedure (suggested by U.S. Pat. No. 3,197,527 for example) a mixture of graphite powder and carbonizable binder is molded to shape and then baked. To repeat, the relative weakness of carbon fibers is so well established that the art seems to have assumed that the poor physical properties of the fiber would carry through to the final graphitic carbon/carbon composite.

However, tests made with typical binder materials, i.e., petroleum pitch, or phenolic resin and carbon fibers, seem to confirm the rationale of this invention. During the course of the carbonization and graphitization heat treatment the binder pitch matrix shrinks, which is likely attributable to volatiles outgassing, and the carbon fiber elongates and crystallizes (stress graphitization). The density of the composite, the flexural modulus, and strength increase substantially during the course of the treatment cycle as the carbon fiber and matrix convert to graphite. Comparable block specimens have been made (employing a standard treatment cycle) with one set of samples containing 50% by volume of high quality graphite fibers (Thornel 50), the other set of samples were made with carbon fibers formed from rayon filaments. Phenolic resin was employed for the carbonizable binder. The fiber reinforcements were laid unidirectional. The carbon fiber samples were carbonized, then graphitized then (without reimpregnation), graphitized twice more (graphitizing temperature level at 2800°C). The graphite fiber samples were subjected to a three time reimpregnation with binder-regraphitization sequence. The test results are shown in Table II. Table I shows the general range of properties obtained for composites made with graphite fibers and this treatment sequence.

The effect on density strength and modulus of the composite material resulting from repeated cycling is dramatically displayed in the Tables.

Hereafter, the process parameters are provided. Where the examples were maintained at the specified temperatures during cycling, e.g., cooled, carbonization and graphitization temperatures, they were maintained there for the purpose of achieving temperature equilibrium in the sample and then some, as is the common practice in this art.

The improvement in the properties of the composite with each cycle of cooling, carbonizing and graphitizing cannot be easily explained. Firstly, each cycle was identical with the previous one so that the structure achieved on the first cycle should not have changed in subsequent cycles. Secondly, even if the sample had undergone further graphitization with each cycle, this fact alone would not necessarily improve the properties of the material.

It is theorized that the increase in density, strength and modulus of the composites results, primarily, from the different crystal structures in the filaments and matrix. After the first cycle it is thought that the matrix and filaments reacted differently during cooling and subsequent heating. Further, it is theorized that on second and subsequent heating, the matrix imposed additional stress on the filaments and thereby increasing the anisotropy of the filaments. It is clear from the x-ray data in Table III that further graphitization took place though the carbonization and graphitization temperatures were not changed at each cycle.

Table I

| | 1-D Thornel 50 (50% by vol. Fibers) | | |
| --- | --- | --- | --- |
| | $\rho$(gms/cm$^3$) | Flexural Strength | Flexural Modulus |
| 1st carbonization | 1.35–1.40 | — | 18–25 $\times$ 10$^6$ psi |
| 1st graphitization | 1.50 | 30,000 psi | 25–35 $\times$ 10$^6$ psi |
| 3rd graphitization | 1.70–.180 | 60,000 psi | 35–42 $\times$ 10$^6$ psi |

Table II

COMPARISON OF MECHANICAL PROPERTIES DATA OF 1D VYB AND 1D THORNEL 50 CARBON/CARBON COMPOSITE

| | 1D VYB Carbon/Carbon Composite | | Thornel 50 1D Carbon/Carbon Composite Graphite Fiber |
| --- | --- | --- | --- |
| | 1st Graphitization | 2nd Heat Treatment | |
| Density g/cc | 1.28 | 1.63 | 1.70 |
| Flexural Modulus of Elasticity $\times$ 10$^6$ psi | 4.82 | 12 16(Sonic) | 40 |
| Mechanical Flexural Strength psi | 15,800 | 31,000 | 46,000 |
| Mechanical Compression Strength psi | 18,900 | 41,700 | 63,000 |

Examination of the fiber and matrix microstructure of the 1D VYB composite along the axis of the composite after the second heat treatment indicated that the fiber and matrix microstructure was highly aligned and oriented. The apparent $d_{(002)}$ spacing decreases and the apparent crystallite dimension $L_c$ increased substantially.

The x-ray diffraction results from the 1D VYB carbon/carbon composite after heat treating indicated that both the fiber and matrix microstructure were highly aligned and oriented. The composite is highly graphitized as was indicated by a significantly larger average crystallite dimension parallel to the crystallographic axis. In addition, the $d_{(002)}$ became smaller after each carbonization, graphitization treatment and the crystallite dimension $L_c$ grew larger. Table III below provides the test data on x-ray diffraction tests of this composite.

TABLE III - X-RAY DIFFRACTION RESULTS OF PYROLYZED - 1D VYB PHENOLIC COMPOSITE

| Processing | $d_{(002)}$ * | $L_c$ ** | 1D Composite Density | 1D Composite Ultrasonic Modulus | 1D Composite Volume Fiber % | 1D Composite Fiber Modulus *** |
|---|---|---|---|---|---|---|
| Carbonization | Ends of Composite 4.17A | 9A | 1.40 g/cc | 3.82 × 10⁶ psi | 50 | 8 × 10⁶ psi |
|  | Sides of Composite 4.29A | 9A |  |  |  |  |
| Graphi- | Ends of Composite 3.60A | 16A | 1.28 g/cc | 4.82 × 10⁶ psi | 55 | 9 × 10⁶ psi |
| tization | Sides of Composite 3.40A | 137A |  |  |  |  |
| 1st Heat | Ends of Composite 3.493A | 24A | 1.43 g/cc | 13.75 × 10⁶ psi | 70 | 20 × 10⁶ psi |
| Treatment | Sides of Composite 3.378A | 252A |  |  |  |  |
| 2nd Heat | Ends of Composite 3.40A | 93 |  |  |  |  |
| Treatment | Sides of Composite 3.376A | 259A | 1.63 g/cc | 15.97 × 10⁶ psi | 70 | 23 × 10⁶ psi |

\* d (A) = (.002) spacing
\*\* $L_c$ (A) = Average crystallite dimension normal to basal planes (.002)
\*\*\* Calculated from law of mixture ($E_m$ — .5 × 10⁶ psi)

Thus, to recapitulate, the practice of the present invention contemplates forming graphitic carbon/carbon composites according to usual practices in the art and employing customary binder materials including for example, phenolic resins, coal tar pitch, etc., with the carbon fiber reinforcement. One processing technique preferred for making the carbon/carbon composite starting with carbon fibers is carbonization of the shaped resin impregnated carbon fiber reinforced composite at staged, slowly increasing temperature levels going from about 200°F to 1200°F over a 60-hour period, followed by maintenance of 1200°F in the furnace (all in a nitrogen atmosphere) for about 15 hours, after which the material is cooled. Subsequently (in an argon atmosphere), the carbonized composite is heated slowly over a 25-hour period at 2700°C, then maintained at that temperature level for 5 hours, following which the now graphitized composite is permitted to cool. For a denser, stronger product, the composite may be cycled through the carbonization-graphitization treatment once, with or without reimpregnation between cycles, twice or three times.

During each carbonization-graphitization heat treatment the matrix shrinks, volatiles outgas and the fiber elongates. To repeat, the ultimate graphitized carbon/carbon composite product made with carbon fibers reasonably approaches the structural characteristics of comparably formed composites obtained when high quality graphite fibers are employed, having for example, flexural strength in excess of 30,000 psi and compression strengths in excess of 40,000 psi. However, the graphitized carbon/carbon composites have not quite achieved the high density and flexural strength, e.g., 1.75 and 60,000 psi obtainable when high quality graphite fibers are employed for the reinforcement. However, the cost of the carbon fiber is much less than the cost of the graphite fiber, a substantial saving in fiber cost (which may be in excess of 90%) is possible. Fiber costs materially effect cost of the high fiber content carbon/carbon composite. Generally fiber volumes in the graphitized carbon/carbon composites are in the range of about 30–65%. About 45–50% is a preferred range for the high strength, high modulus shaped composites. The present graphitized carbon/carbon composite may therefore be more economical for all uses of such products except those where the need for maximum strength far outweighs economic considerations.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A process for forming high-quality graphitic carbon/carbon composites which comprises slowly heating a shaped composite of low-modulus amorphous carbon fibers impregnated with a carbonizable binder to a temperature at which the binder is carbonized, then holding the composite at about that temperature until stabilized, thereafter subjecting the composite to slowly increasing temperatures up to about 2,700°C, and holding at about that temperature until the mass is stabilized and slowly cooling the now graphitized composite, repeating said heating, graphitizing and cooling cycle at least one additional time until the resulting composite has a density of 1.5 or greater, a flexural strength of 30,000 psi or greater, and a flexural modulus of 25 × 10⁶ psi or greater.

2. The process of claim 1 wherein the fiber volume of the graphitized carbon/carbon composite is in the range of about 30–65%.

3. A process as defined in claim 1 where the graphitized composite is reimpregnated with a carbonizable binder between heating and cooling cycles.

4. A process as defined in claim 1 where the carbonizing temperature is about 1,200°F.

* * * * *